C. M. STEVENSON.
Lathes for Making Wooden Screws.

No. 148,335. Patented March 10, 1874.

UNITED STATES PATENT OFFICE.

CHARLES M. STEVENSON, OF SYRACUSE, NEW YORK.

IMPROVEMENT IN LATHES FOR MAKING WOODEN SCREWS.

Specification forming part of Letters Patent No. 148,335, dated March 10, 1874; application filed August 21, 1873.

*To all whom it may concern:*

Be it known that I, CHARLES M. STEVENSON, of Syracuse, New York, have invented a Lathe for Making Wooden Screws, &c., of which the following is a specification:

The purposes of this invention are to cut screw-threads upon conical or irregular surfaces formed in the machine without being removed therefrom. The construction is as follows, referring to the accompanying drawing, in which—

Figure 1:
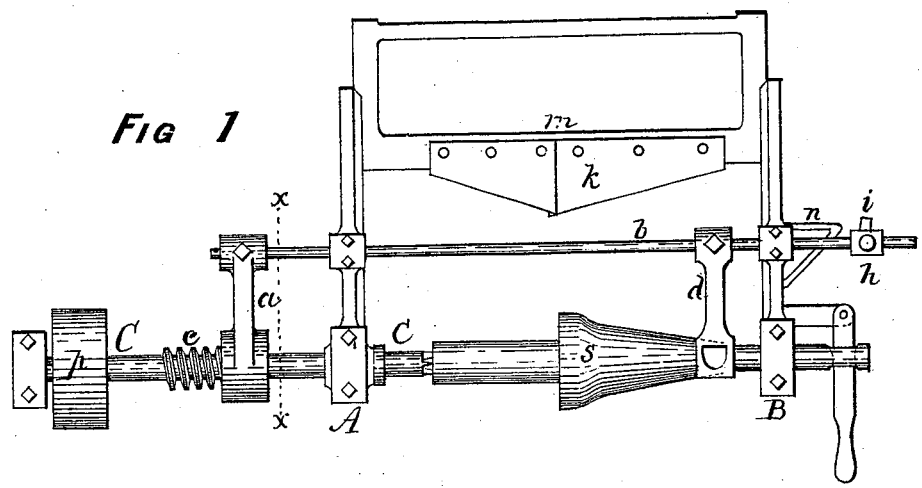
Figure 2:
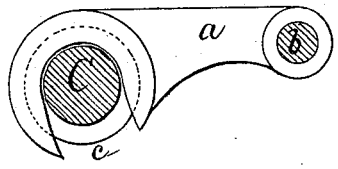
Figure 3:
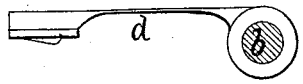

Figure 1 is a top plan. Fig. 2 is a section on line $x\ x$, Fig. 1; Fig. 3, the cutter for cutting the screw-thread.

A sufficient frame, having puppet-head A and tail-block B, is made somewhat analogous to a lathe in those particulars. In the puppet-head are bearings for a mandrel, C, which is turned by a band-pulley, $p$. On the neck of this mandrel a screw-thread, $c$, is cut, which projects beyond the surface of the mandrel the depth of the thread, as clearly seen in Fig. 1, where the mandrel on each side of the screw $c$ is smaller. A nut is made to fit the screw $c$, and a space is cut out of its under side sufficiently large to allow it to be put onto and taken off of the smaller part of the mandrel on either side of the screw $c$, so that it can be put onto the mandrel, and then be engaged with the screw $c$, which prevents its being lifted off or disengaged until it passes over clear of the screw, when it can be lifted off the mandrel. This is important, as will be hereafter seen. In operating the machine the nut is connected with an arm, $a$, affixed to a round rod, $b$, having its bearings in the puppet-head and tail-block, as clearly seen in Fig. 1, in which it slides endwise. On this rod $b$ is affixed an elastic arm, $d$, or the equivalent thereof, having thereon a cutter to cut a screw-thread, and on the end of the rod $b$, outside of the tail-block, a weighted handle, $h$, is affixed, having a projection, $i$, on it. On the tail-block I affix an inclined lug, $n$, which, when the projection $i$ strikes it, the rod $b$ is turned and the cutter and nut are thrown back. A sliding carriage, $m$, slides under the mandrel, as shown, Fig. 1, carrying a knife, $k$, on it, formed to turn the piece of wood to be threaded to the form required, which is determined by the configuration of the knife.

The operation is as follows: The piece of wood to be shaped is put onto the mandrel, and put into revolution, as in a lathe. The sliding carriage $m$ and knife $k$ are brought forward, and the piece $s$ turned into form, as seen in the drawing, and of any required taper or other figure. The carriage is then thrown back out of the way, and the rod $b$, with its attachments, is drawn toward the tail-block until the nut on arm $a$ is brought over the small part of the mandrel, the arm $d$ and its cutter being then opposite the end of piece $s$ to be threaded. The nut is then turned down over the small part aforesaid of the mandrel and borne toward the screw $c$, with which it engages, and is held thereupon until it has passed entirely over the length of the screw. This draws with it the cutter-arm $d$, which causes a thread to be cut upon the surface of the piece $s$, the spring-arm allowing the cutter to follow the taper, &c., while the nut is prevented from rising by embracing the screw $c$, as before stated.

The carriage $m$ and rod $b$ can be moved by hand, or automatically, as is found most convenient.

Having thus fully described my invention, I claim—

The threading apparatus, consisting of the mandrel C and nut, constructed as described, and combined with the elastic armed cutter $d$, so that the nut, while in connection with the screw on the mandrel, holds the cutter down to its work, as and for the purposes described.

C. M. STEVENSON.

Witnesses:
J. J. GREENOUGH,
Z. JONES.